United States Patent [19]

Weindling

[11] Patent Number: 4,724,418

[45] Date of Patent: Feb. 9, 1988

[54] SYNTHETIC APERTURE RADAR FOCUSING

[75] Inventor: Frederik Weindling, Norwalk, Conn.

[73] Assignee: United Technologies Corporation, Hartford, Conn.

[21] Appl. No.: 842,959

[22] Filed: Mar. 24, 1986

[51] Int. Cl.$^4$ .............................................. G01S 13/89
[52] U.S. Cl. ..................................... 342/25; 342/131; 342/137
[58] Field of Search .............. 343/5 CM, 17, 17.1 PF, 343/17.1 PW; 328/25, 131.1, 137; 342/25, 179, 190, 191, 195, 200–202, 131, 137

[56] References Cited

U.S. PATENT DOCUMENTS 3,858,208 12/1974 Parke et al. ............. 343/17.1 PF X
4,084,158 4/1978 Slawsby ........................... 343/5 CM
4,132,989 1/1979 Arens ............................... 343/5 CM

OTHER PUBLICATIONS

J. DeLeon, "Sar to Map the Surface of Venus", *Microwaves*, (1/77, vol. 16, No. 1, pp. 12–14).

Primary Examiner—Theodore M. Blum
Assistant Examiner—Bernarr E. Gregory

[57] ABSTRACT

An extended depth-of-focus synthetic aperture radar (SAR) system (13) mounted on a moving platform, including a controller (120), pulse timer (83), synthesizer (105) and modulator (17) for varying the pulse rate interval (PRI) and/or the radar carrier frequency of radar pulses produced, in order to establish a radar return which, when conventionally processed, results in a SAR terrain map exhibiting extended depth-of-focus under conditions of platform acceleration. Depth of focus is established by ensuring the establishment of two or three separate, independently selected focal points in a target region of interest.

4 Claims, 4 Drawing Figures

TO FIG. 2B

500a
USING THE ABOVE PARAMETERS, COMPUTE CONSTANT "$c_1$" AS FOLLOWS:

"$c_1$" = 4piV($U_1$-$U_0$)PRI/LAMBDA

600a
BEFORE TRANSMISSION OF A NEXT RADAR PULSE, COMPUTE DELTA T OR DELTA LAMBDA AS FOLLOWS:

"DELTA T" = $c_1$LAMBDAV($U_1$-$U_0$)/4pi

"DELTA LAMBDA" = (($c_1$LAMBDA/4pi)-V($U_1$-$U_0$)PRI)LAMBDA/($r_0$- $r_1$)

SYNTHETIC APERTURE RADAR FOCUSING

CROSS REFERENCE TO RELATED APPLICATIONS

Three separate commonly-owned U.S. Patent applications are filed on even date herewith relating to the same general subject matter and having the indicated respective U.S. Patent Application Ser. Nos. 842,961, 842,959 and 842,951, the first and third application are now U.S. Pat. Nos. 4,706,088 and 4,706,089 respectively, entitled SYNTHETIC APERTURE RADAR FOCUSING.

TECHNICAL FIELD

This invention is directed toward the technology of motion-compensated, synthetic aperture radar (SAR) systems.

BACKGROUND ART

Synthetic aperture radar (SAR) systems in general are well known. Further, motion-compensated synthetic aperture radar systems have been in development and use for many years.

One object of such systems is to generate terrain maps from a moving platform in flight. The map generated thus describes a selected portion of the terrain observed by an aircraft for example.

The radar system can be adjusted by the pilot as desired, within certain bounds of course, to determine the precise location and size of the patch or portion of terrain being observed, mapped or monitored. Generally, the terrain to be mapped is below the aircraft and off to the side. The aircraft typically flies at a given altitude and variable velocity, and its radar has a downward angle of view.

The radar transmits repeated radio frequency (RF) pulses at a selected pulse repetition frequency (PRF) or its inverse, the pulse repetition interval (PRI), toward the terrain to be mapped. After each pulse transmission, the radar receiver waits to receive any return from the selected terrain.

Since the radar has been set to receive a return from a given, preselected general region—the selected map area—and the radar signals travel at a known velocity, it is known precisely when a return is likely to come from terrain at a given range. In fact, the expected time of return of signals from subdivisions within the area to be mapped can also be precisely determined.

Accordingly, for each transmitted pulse, depending upon the terrain, there will be return corresponding to a preselected number of range portions of the area to be mapped. It is of course not possible initially to resolve precisely from which angular location the return comes. Such resolution is however possible after the data for each range bin has been spectrally analyzed (as by Fourier transform for example).

Nonetheless, meaningful information is acquired in the form of a complex number representative of the return phase and magnitude for a predetermined number of range bins in the selected terrain area. Those complex numbers, representing the return over time derived from a single output pulse, are representative of all of the range bins covering the selected terrain.

As the radar platform continues flight, further pulses are transmitted and their return is received. For each subsequent transmitted pulse, a complex return is received, and this in turn is stored in a corresponding range bin. In the end, a complex matrix will have been established, which contains bundles of information regarding the terrain at selected ranges for the map region selected.

As suggested above, in order to map the terrain, these bundles of information need to be analyzed as to angle or location. This is done by Fourier transforms, which convert the information into frequency information, thereby permitting the angle and amplitude of the return to be established. There will be a separate Fourier transform performed for each range bin.

To correct for the changes in position of the radar platform over time—that is to correct for the change in position between successive pulse transmissions, which affects the phase of the return—it is necessary to perform a function on the return signals known as focusing, or motion compensation. This process causes a single point on the map, known as map reference center, to come into sharp focus.

This is done conventionally by placing accelerometers in the moving radar platform. These accelerometers provide signal indications of the changes in motion during spatial translation of the platform. In other words, acceleration information is produced. This does not, of course, directly specify the new location to which the platform has traveled.

To accomplish this, two integrations of the acceleration information are, in effect, constructed. First, the acceleration components in each of the standard coordinate directions are integrated to provide corresponding velocity information. Then another integration is performed upon the velocity information to produce actual location indications with respect to the standard coordinate directions.

From this new position information, a phase correction can be applied to signals coming from the same map location, which correction corresponds to the change in range. By applying this correction, the effective range from the radar center or platform to the map reference center is forced to be equal for successive radar pulses. As a result, the return from an object located at the map reference center will appear in the radar map as a point in sharp focus.

When all of the information regarding the same terrain portion for a sufficient number of successive pulses is analyzed by Fourier transform, the resulting frequency information is translated into phase and field angle information. Thus, the intensity of return for a specific map location can be determined.

Alternately, the motion information, instead of being computed for a preselected map reference center from accelerometer measurement data, can be extracted from the radar returns of prominent radar scatterers. This method is known as "autofocus".

According to the prior art, producing radar pulses at a regular pulse rate intervals is well known. Moreover, setting the carrier frequency of the transmitted pulses to a specific predetermined value is well known.

It is also well known, however, that the geometric extent of the focused area of maps produced by current synthetic aperture radar systems is reduced by changes in aircraft movement and flight maneuvers. In other words, established SAR mapping techniques are subject to severe limitations in terms of depth of focus, when the radar platform moves abruptly.

Two methods have been used to mitigate the reduction in depth of focus under accelerated aircraft motion.

According to one method, by using standard focusing techniques, a multiplicity of SAR maps are produced of adjacent areas, each having a depth of focus limited by the aircraft acceleration. The size of the resulting map defines the extent of the increase in the depth of focus.

Such an approach, which uses a multiplicity of map reference centers (or, in the case of "autofocus", of prominent scatterers) is, however, typically expensive in terms of hardware and/or software development costs as well as in processing time. Alternately, a variation of the radar pulse repetition interval (PRI) or its inverse, the pulse repetition frequency (PRF) is used.

The prior art of PRF variation does include use of more than a single focal point; the location of a second point cannot, however, be selected, but it is determined by the nature of the particular algorithm for PRF variation.

DISCLOSURE OF INVENTION

According to the invention, an enhanced depth of focus radar map of a selected region under surveillance is enabled over a widened portion of the map surveyed. This is accomplished by varying the pulse repetition frequency (PRF) and/or the radar carrier frequency (RF) on the basis of information supplied by aircraft inertial sensors to force one or two arbitrary points of the map, in addition to a third point such as an already selected map reference point, into sharp focus.

As a result, an improved radar terrain map of predetermined size and location can be obtained, which is characterized by an extended depth of focus. This is produced according to the invention by periodically adjusting the radar carrier frequency (RF) or the repetition interval (PRI) of each radar pulse, or both, for a radar platform in flight, according to relationships set forth below.

The foregoing and other objects, features and advantages of the present invention will become more apparent from the following description of preferred embodiments and the accompanying drawings.

BEST MODE FOR CARRYING OUT THE INVENTION

Figure 1:
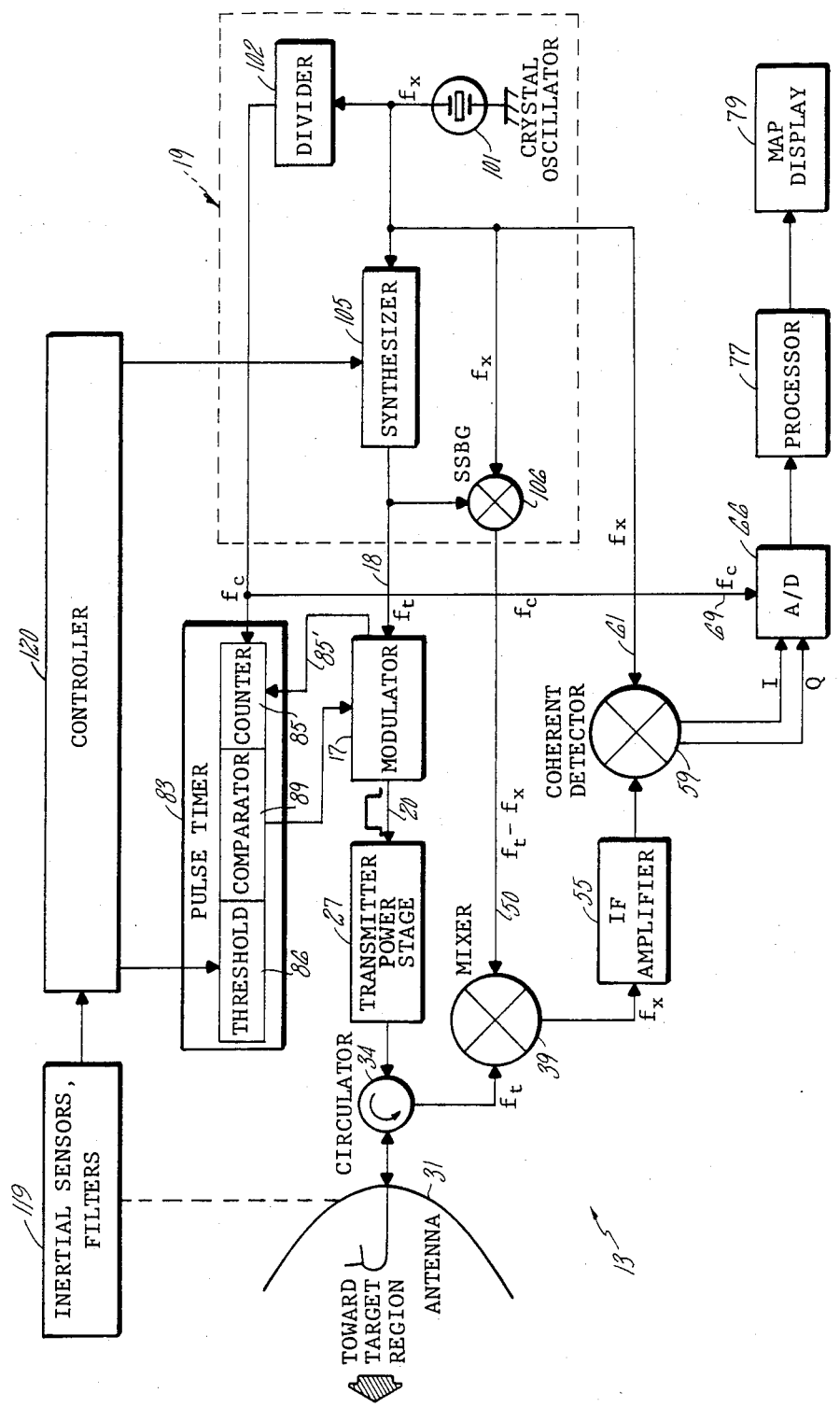
FIG. 1 shows a system block diagram of the extended depth-of-focus synthetic aperture radar (SAR) system according to this invention.

FIG. 1 shows a block diagram of the synthetic aperture radar (SAR) system 13 according to the invention herein. In particular, the SAR system 13 includes a modulator 17 which receives a stable radio frequency carrier signal along line 18 from an exciter synthesizer system 19.

The modulator 17 effectively modulates a radio frequency (RF) signal received on line 18 to produce a series of output pulses on line 20 having a selected pulse width. This RF carrier signal "$f_t$" is produced in exciter synthesizer system 19 at frequency synthesizer 105, according to well-known electrical design techniques using known hardware elements which receive input frequency "$f_x$" from crystal oscillator 101, and multiply it to establish a higher frequency "$f_t$" to serve as carrier for the transmitted radar signal launched from antenna 31.

The output pulses on line 20 are amplified by a transmitter power stage 27, which feeds a radar antenna 31 via a circulator 34. The transmitted pulses from modulator 17 and passing through circulator 34 thus radiate from the antenna 31 to propagate toward a selected target region (not shown) which is under surveillance. A portion of the transmitted signal is reflected from the illuminated target and returned to antenna 31 for detection as will be shown.

In particular, some of the reflected signal energy is captured upon return by the antenna 31 and fed back to the circulator 34 and from there to a mixer 39, where it is combined with a suitable difference frequency 50, i.e. "$f_t - f_x$" from the exciter synthesizer system 19. This difference frequency, also known as the stable local oscillator frequency (STALO), is the transmitted frequency "$f_t$" less the crystal oscillator frequency "$f_x$" as generated by single sideband generator 106 according to well-known design principles and with the use of conventional hardware. According to one version of the invention, the value of "$f_t$" to be combined with "$f_x$" is variable, to account for the platform movement, even when the transmitted carrier frequency "$f_t$" is held constant, which would be another version of the invention.

The output of mixer 39 establishes the reflected signal received by antenna 31 as an intermediate frequency (IF) signal, which is the same as the crystal oscillator frequency "$f_x$", because mixer 39 combines "$f_t$" from circulator 34 and the difference "$f_t - f_x$. The IF signal is amplified at IF amplifier 55, as shown. The mixer output signal is further coherently detected by coherent detector 59 with reference to the phase of a reference signal at the same frequency "$f_x$" on line 61 from the exciter synthesizer system 19 and crystal oscillator 101.

In actuality, there is relative motion between the antenna and the ground to be mapped, which results in a doppler shift of the return frequency. This very phenomenon makes synthetic aperture radar possible. Thus, the input frequencies to the mixer 39 and to the IF amplifier 55, although labeled "$f_t$" and "$f_x$", respectively, are in reality offset from those values by the doppler shift.

The resulting in-phase and quadrature signals respectively "I" and "Q" are then timed, converted from analog to digital form in an analog-to-digital converter 66, which is subject to a clock signal "$f_c$" established by dividing the crystal oscillator 101 in frequency divider 102 to produce a lower frequency along timing line 69. The information thus digitized is stored and processed conventionally to establish a SAR map in processor 77. The output of the processor 77 can be fed to a map display 79. These particular processes are conventional and well-known according to the present state of the art of SAR mapping.

FIG. 1 further shows a pulse timer 83 for varying the pulse repetition interval (PRI) of the SAR system 13 by controlling the timing of output pulses from modulator 17, each being at the indicated RF carrier frequency "$f_t$".

The timer 83 is shown including two digital registers 85 and 86, respectively, the first being a counter of clock pulses from frequency divider 102, and the other being a fixed register containing a binary number corresponding to the desired time of the next pulse transmission. A comparator 89 in timer 83 triggers the pulse modulator 17, when the numbers in the two registers are equal. After the transmission of a pulse from modulator 17, the counter 85 is reset along lines 85′.

The exciter synthesizer system 19 includes a stable crystal oscillator 101, frequency divider 102 effective for establishing a predetermined clock frequency "$f_c$", synthesizer 105 including multipliers, adders and phase-lock-loops (PLL) as is well known in the art of designing radar circuits, and single sideband generator 106, as already suggested.

The outputs of the exciter synthesizer system 19 include lines 18 and 61 carrying signals charcterized by respective frequencies "$f_t$" and "$f_x$".

The SAR system 13 further includes a controller 120 which generates signals that control the operation of the exciter synthesizer 19 in the production of transmission frequency "$f_t$", and other signals which control pulse timer 83. This generator 120 accordingly determines the precise time of occurrence and the radio frequency of each transmitted pulse according to the scheme indicated below. Its mechanical implementation can take a variety of forms, such as that of dedicated hardware or a special or general-purpose computer.

The controller 120 employs predetermined initial nominal values for pulse repetition intervals (PRI), i.e. "delta t", which corresponds to the time between sequential output pulses from modulator 17, and for wavelength "lambda" which corresponds to the operational, or nominal output carrier frequency "$f_t$" of the radar system, as well as according to one version of the invention, first and second constants, "$c_1$" and "$c_2$" which are computed on the basis of three preselected focal points on the map to be produced as will be shown. These points are selected to maintain adequate depth of focus in several regions of the area being mapped.

For each radar pulse on line 20 to be produced, new values of "delta t" (or PRI) and/or "delta lambda" are determined as suggested below. This will establish the time at which a next radar pulse is to be transmitted after the time of a prior pulse transmission, and further establishes the wavelength of this pulse.

Figure 2A:
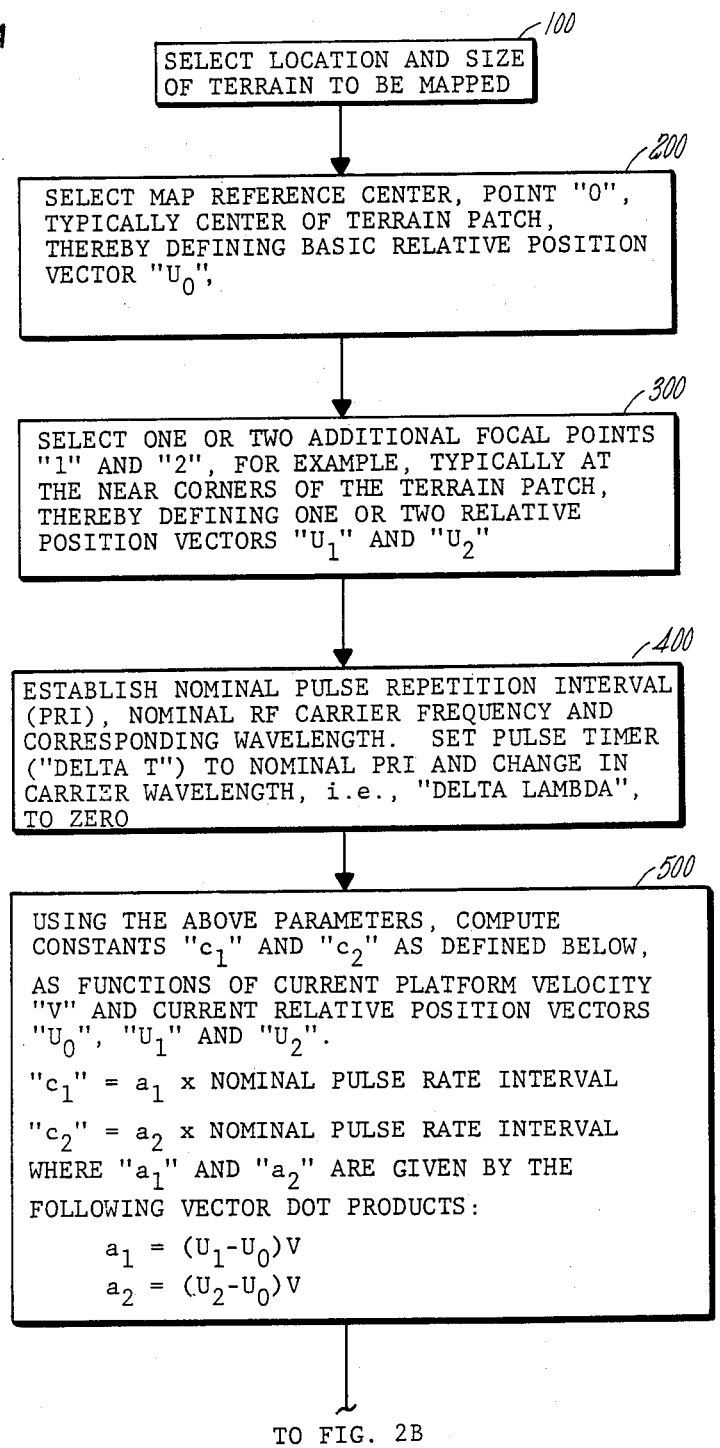
FIGS. 2A and 2B are a flowchart illustrating operation of one version of the invention in which both carrier frequency and pulse interval are varied.
Figure 2B:
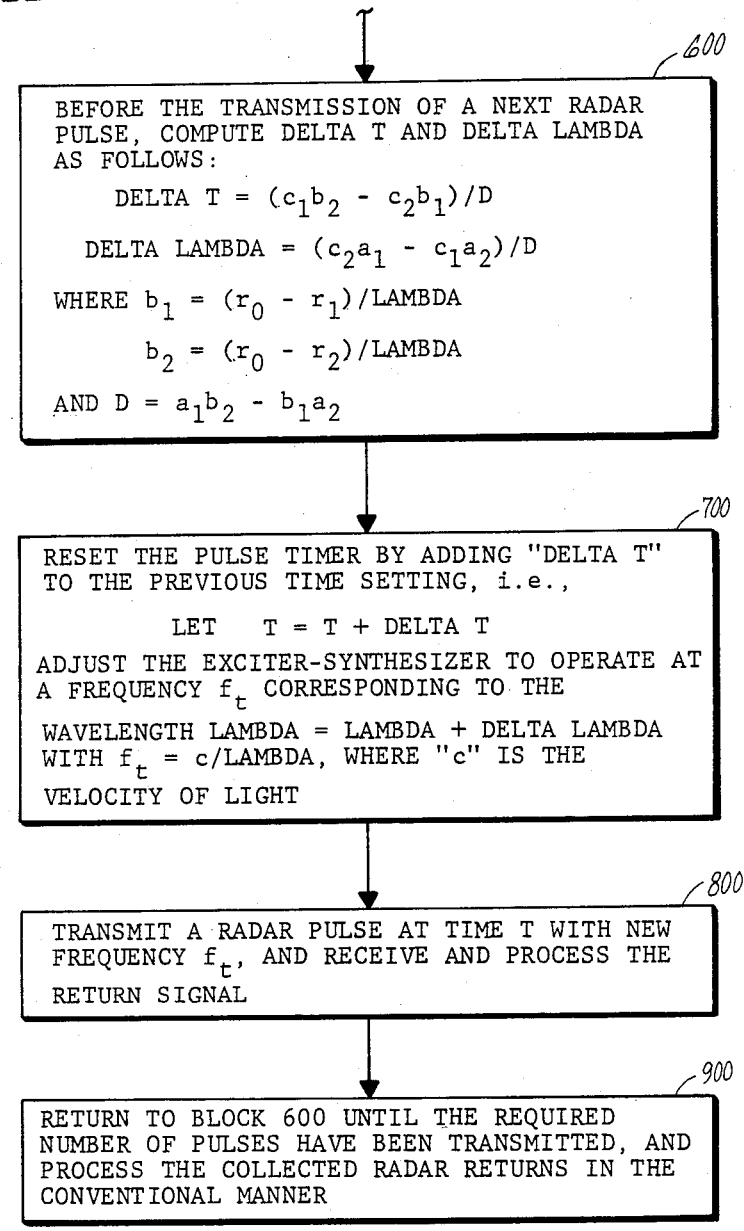
Figure 3:
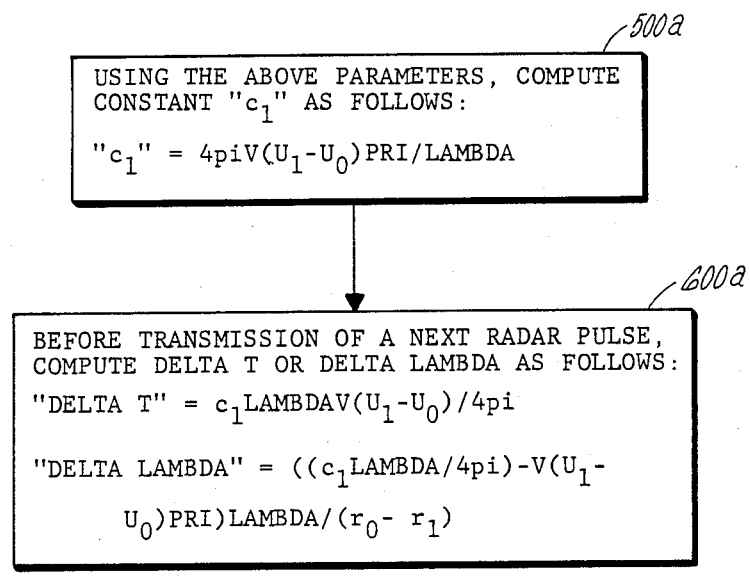
FIG. 3 is a partial flowchart of blocks 500 and 600 which can be substituted in FIGS. 2A and 2B to show other versions of the invention in which either carrier frequency or pulse repetition interval alone is varied.

For clarity of illustration "delta t", "delta lambda" and "lambda" are capitalized in the flowcharts of FIGS. 2A, 2B and 3.

As is well known in the art, frequency and wavelength are functionally interrelated in a well known fashion. Most simply stated, in free space, the relationship is $f_t = c/\text{lambda}$, where "c" is the speed of light, lambda is the wavelength, and "$f_t$" is the frequency transmitted.

The derivation of the relationships which are central to one version of the invention herein, according to which three focal points are established in the region mapped and both pulse rate frequency and carrier frequency are varied, can begin with the following equations, which in turn are based upon principles established even further below:

For $i=1,2$: $a_i(\text{delta t}) + b_i(\text{delta lambda}) = c_i$, where the quantities "$a_i$" are equal to the dot products $(U_i - U_0)[V]$; "$U_0$" is the unit direction vector to the selected map reference cenmter; "$U_i$" are unit vectors in the direction of each of two other selected points respectively on the map region; and "V" is the velocity vector of the radar antenna phase center; "$b_i$" are equal o $(r_0 - r_i)/\text{lambda}$, "$r_0$" is the distance from the antenna phase center to the selected map reference center; and "$r_i$" are the distances from the antenna phase center to the selected respective first and second points on the map which are independent from each other and the selected map center; and finally, "$c_1$" are system constants, as will be discussed further. All vector multiplication suggested herein is by dot product.

The above relationships can be manipulated in accordance with well-known matrix and linear algebra techniques to yield the following: "delta t"$=(c_1 b_2 - c_2 b_1)/D$ and "delta lambda"$=(c_2 a_1 - c_1 a_2)/D$, where "$D$"$= a_1 b_2 - b_1 a_2$. Accordingly, "delta t"$=[c_1 b_2 - c_2 b_1]/[a_1 b_2 - b_1 a_2 9$, and more particularly: "delta t"$=[c_1(r_0-r_2) - c_2(r_0-r_1)]/[(V)][(U_1 - U_0)(r_0-r_2) - (U_2-U_0)(r_0-r_1)]$, where "$r_i$" and "$U_i$" to are defined for values of "i" equal to "0", "1" and "2" in accordance with definitions already laid out and presented above.

The constants "$c_1$" and "$c_2$" are established using initial values for "delta t" and "delta lambda" which are supplied to controller 120 prior to beginning regular operation, and initial values of $a_1$, $a_2$, $b_1$, $b_2$ by means of the following linear equations which have already been discussed: $c_1 = a_1(\text{delta t}) + b_1(\text{delta lambda})$ and $c_2 = a_2(\text{delta t}) + b_2(\text{delta lambda})$; where "$a_1$" and "$a_2$" are defined by the relationship $a_i = (U_i - U_0)[(V)]$ for "i" equal to "1" and "2", and "$U_i$" is a unit vector to selected first and second locations on the region being mapped and V is the platform velocity; and "$b_1$" and "$b_2$" are defined by the relationship: $b_1 = (r_0-r_1)/\text{lambda}$ for the same values of "i" as above, and "$r_i$" are the distances from the platform to said locations on the map, and "lambda" of course is a predetermined initially selected wavelength used in these linear equations. For the purpose of evaluating the constants "$c_1$" and "$c_2$" to be used for the synthetic aperture, the quantity "delta t" is taken to be the initial pulse repetition interval; "delta lambda" can conveniently be set equal to zero.

Similarly, the relationship for "delta lambda" can be developed further as follows: "delta lambda"$=[c_2 a_1 - c_1 a_2]/[a_1 b_2 - b_1 a_2]$ in turn resulting in: "delta lambda"$=[c_2(U_1-U_0)V - c_1(U_2-U_0)V][\text{lambda}]/[(r_0-r_2)(U_1-U_0)V - (r_0-r_1)(U_2-U_0)V]$.

According to other versions of the invention, suggested in FIG. 3, only two focal points are established in the region mapped, and only the pulse rate frequency or the carrier frequency are varied. In these cases, the formulas for "delta t" and "delta lambda" are as follows:

"delta t"$=c_1(\text{lambda})/4\ \text{pi}[V(U_1-U_0)]$ and

"delta lambda"$=[c_1(\text{lambda})/4\ \text{pi} - [V(U_1-U_0)][\text{PRI}]][\text{lambda}/(r_0-r_1)]$;

where "$c_1$"$=(4\ \text{pi})[V](U_1-U_0)\text{PRI}/(\text{lambda})$; PRI is the initial pulse interval, which is the inverse of the pulse frequency; "$U_0$" is the first direction vector at an initial time, "$U_1$" is the second direction vector at that time, and "$V_0$" is the initial velocity of the radar platform. In the relationships immediately above, it is assumed that only the pulse interval or the carrier frequency (or its related wavelength) are varied, and not both of them as defined in the relationships preceding the latter.

The controller 120 accordingly adjusts, in two versions of the invention, the SAR system 13 to operate at a selected carrier frequency, and more importantly at a mixer reference frequency, (STALO), corresponding to the wavelength "(lambda)$_j$"="(lambda)$_{(j-1)}$"+"(delta lambda)", as suggested in FIGS. 2A and 2B. Further, in one of these two versions and in a third version of the invention, a next pulse 20 to be transmitted at the time $t_j = t_{j-1} +$ (delta t), where "j" is the index of the pulse number. This latter expression indicates that the time of occurence of a pulse is the time of the former pulse incremented by "delta t", whereby the pulse interval is varied.

Thus, a desired number of returns are coherently detected, stored and processed conventionally in processor 77 to yield a SAR map having an enhanced depth-of-focus.

This is set forth generally in the flowchart of FIGS. 2A and 2B, which shows the basic scheme according to which the invention operates in the version having both variable pulse interval and variable carrier frequency. By reference to these Figures, it will also be explained how the system operates to enhance depth of focus by varing only one of these two parameters. In the case of varying both parameter, three focal points are established in the region mapped, whereas in the single variable parameter cases, two focal points are established.

To proceed, FIG. 2A shows operation beginning with the pilot or operator of the system selecting the location and size of the terrain region to be mapped as indicated in block 100. This is typically done for example by turning a control knob (not shown) on the actual radar set or console. In particular, the operator thereby establishes the aspect, range and size of the region mapped. Blocks 200 and 300 indicate the selection of the focal points defining initial position vectors and ranges, "$U_0$", "$U_1$", "$U_2$", "$r_0$", "$r_1$" and "$r_2$" according to a pre-established scheme for selection of three focal points. If only two focal points are to be established, "$U_0$", "$U_1$", "$r_0$" and "$r_1$" are defined.

The direction vectors point generally in the same direction and have generally the same magnitude, but the slight variations therebetween are of key significance. The distances "$r_0$", "$r_1$", and "$r_2$" are the respective distances from the radar antenna to points 0, 1 and 2. In any case, these vectors and distances correspond to the selection of focal points in the map region selected.

Since it is desired that optimally the entire map region be in focus, having the focal points distributed apart in the region is preferred, rather than having the focal points close together. According to one version of the invention, assuming the map region to be generally square, one of the selected points might be a map reference point at the center of the region (as per block 200), and the other or others of the selected points might be corner points of the region, as suggested in part at block 300. The corresponding direction vectors would then incline directly toward those selected points.

In addition to the steps illustrated in block 400 of FIG. 2A, the number of radar pulses to be transmitted in order to conduct an effective Fourier transform according to well-known, conventional SAR design principles, and thereby to obtain angle information regarding signal intensities of the radar return, must be determined conventionally.

Further, as expressly specified in block 400, a nominal pulse repetition interval (PRI) and /or pulse rate frequency is conventionally established. Further, the nominal wavelength corresponding to the nominal carrier frequency is conventionally established.

Beyond this, the pulse timer is set to zero (t=0). Finally, for initializing purposes the change in carrier frequency as represented by the term "delta lambda" is set to zero.

In the case of three focal points involving the variation of both pulse rate frequency and carrier frequency, constants "$c_1$" and "$c_2$" are determined as suggested at block 500, they respectively being equal to [$a_1$][nominal PRI] and [$a_2$][nominal PRI], where "$a_1$"=$(U_1-U_0)(V)$ and "$a_2$"=$(U_2-U_0)(V)$, where "V" is the antenna phase center velocity vector, and each respective vector quantity is representative of initial SAR conditions. Thus, $c_1 = (U_1-U_0)(V)(PRI)$ and $c_2 = (U_2-U_0)(V)(PRI)$.

Next, and before the transmission of a next radar pulse, as suggested at block 600, the changed "delta t" and "delta lambda" values are determined, as follows: "delta t"=$(c_1 b_2 - c_2 b_1)/D$, where $b_1 = (r_0 - r_1)/$lambda, and $b_2 = (r_0 - r_2)/$lambda; and "delta lambda"=$(-c_2 a_1 - c_1 a_2)/D$, where $a_1 = (U_1-U_0)(V)$ and $a_2 = (U_2 - U_0)(V)$ as before, and where each respective vector value is established as determined in the immediately preceding step, and where $D = a_1 b_2 - b_1 a_2$. The velocity "V" is repeatedly determined by inertial sensors 119 mounted on the radar platform 31, according to well known conventional techniques which are not a part of this invention.

Upon accomplishing the above, the pulse timer 83 is reset as suggested at block 700, by adding "delta t" to the previous timer setting, i.e., t=t+"delta t". Further, the exciter/synthesizer 105 is adjusted to operate at a frequency "$f_t$" corresponding to wavelength "lambda"="lambda"+"delta lambda", in view of the relationship "$f_t$"=c/lambda, where "c" is the speed of light if frequency is to be varied.

Thereupon, the radar transmits a pulse at the next time according to the established carrier frequency "$f_t$", receives a return signal and processes the return signal conventionally which established STALO frequency "$f_t - f_x$" in mixer 39, and then processes the output of the mixer in conventional stages 39, 55, 59, 66, 77 and finally displays the results at map display 79.

The indicated process of system 13 then continues by returning for continued operation to repeat the steps indicated in block 600, until the number of radar pulses reaches the predetermined required number. The collected radar return information is in each case processed conventionally.

The above relationships are based upon coherent radar measurement of distance between the radar 13, or antenna phase center, and selected points in the selected target area or on the field observed, using the wavelength lambda as a yardstick.

At any given time, the phase corresponding to a particular point "i" in the target region being mapped is given by the expression: $phi_i = (4 pi) r_i/$lambda, where "$r_i$" is the distance between the antenna phase center and the point "i", and "lambda" is the radar wavelength.

Selecting a central point "0", i.e. zero, for use as a point of reference on the region to be mapped, the differential distance from the antenna phase center to the points "i" and "0" respectively will result in the relationship:

$$\text{"phi}_i\text{"} = (4\ pi)[r_i - r_0]/\text{lambda},$$

where:

"$r_i$" is the distance to each of one or two selected points on the region other than the map center; "$r_0$" is the distance to the map center from the radar platform; and "lambda" is the wavelength of the radar pulse to be transmitted.

To force each or either of the selected points "i" to be in fact a focal point, it is sufficient to ensure that the difference between the selected values of "$phi_i$" (e.g. "$phi_i$" −"$phi_o$") vary by a constant quantity for any two consecutive pulses. This will result in the point "i" being represented by a delta function in the doppler frequency domain, corresponding to a focused condition.

This condition for a constant variation can be written as follows: "delta($phi_i$)", for each value of "i", equals the partial derivative of "$phi_i$" with respect to time, multiplied by "delta t", plus the partial derivative of "$phi_i$" with respect to wavelength multiplied by "delta lambda", which in turn equals $c_i$, where the respective "$c_i$" values are constant values equal to the indicated sum of partial derivative factors, it being contemplated that there will be at least two such points according to the invention; "$phi_i$" is the phase corresponding to a point "i" on the target; "delta t" is a selected time interval; "lambda" is the wavelength of radar pulse transmitted; and "delta lambda" is the change in wavelength lambda as can be implemented by one inventive version discussed herein.

After performing the partial derivative operation, the above expression reduces to: "delta($phi_i$)"=(4 pi/lambda)[V($U_i$−$U_0$) (delta t)−($r_i$−$r_0$)("delta lambda"/lambda)], where: "delta ($phi_i$)" is the phase change in a signal traveling to point "i" and returning to the radar platform; "V" is again the velocity vector representing the aircraft and/or radar platform velocity; "lambda" is the wavelength of the transmitted pulse; "delta lambda" represents a change in the wavelength or frequency made in the transmitted radar pulse with respect to a selected base wavelength or frequency; "$U_i$" is a unit vector from the antenna phase center to a selected point "i" in the region to be mapped; "$U_0$" is the unit vector from the antenna phase center to the map center of the region to be mapped; and "$r_i$" is the distance from the antenna phase center to selected reference points including the center of the region to be mapped.

In the case of only two focal points, for evaluation under initial conditions, the map center, defined by distance "$r_0$" and position vector "$U_0$", and another selected point defined by "$r_1$" and "$U_1$"; the following relationship results: "delta (phi)"=$c_1$=[4 pi/lambda][-V($U_1$−$U_0$)(delta t)−($r_1$−$r_0$)(delta lambda/lambda)].

The above information is likely to induce those skilled in the art to conceive of variations of the invention which nonetheless fall within the scope thereof. Accordingly, reference to the claims which follow is urged as the claims alone specify with particularity the scope of this patent.

I claim:

1. An improved synthetic aperture radar system mounted on a moving platform, comprising:
   means for producing and receiving radar pulses, at a variable pulse repetition interval and at a carrier wavelength;
   means for processing selected received return radar pulses in a mapping operation to form a radar map of a target area containing a predetermined map reference point;
   means for performing a focus operation on said return radar pulses by applying a predetermined phase correction on selected return radar pulses to compensate for a change in platform position between detection of said selected return radar pulses, thereby bringing said map reference point in sharp focus;
   means for measuring the acceleration of said moving platform; and
   means for extending the focused area of said radar map to compensate for acceleration of said moving platform during the mapping process, wherein the improvement comprises:
   means for altering at least one of said variable pulse repetition interval and said carrier wavelength in a predetermined manner in response to signals from said means for measuring acceleration such that, for at least one point in said target area in addition to said map reference point, a phase difference between return radiation from said map reference point and return radiation from said at least one point is substantially constant for consecutive radar pulses, whereby both said map reference point and said at least one point are in sharp focus and said radar map has an improved depth of focus.

2. The system of claim 1, further characterized in that said variable pulse repetition interval PRI is variable according to the relationship $$PRI = (c_1)(\lambda/4\pi)\{V(U_1 - U_0)\}$$

where "$c_1$" is a system determined constant, "V" is the velocity of the radar platform, "$U_1$" and "$U_0$" are respective direction vectors from the moving platform to said two independent points in said target region to be held in focus, and "lambda" is the instantaneous carrier wavelength.

3. The system of claim 1, further characterized in that said carrier wavelength is altered from a preceding carrier wavelength by an amount delta lambda given by the relationship $$\text{delta lambda} = /[(c_2 \text{lambda}) - V(U_1 - U_0)PRI]\text{lambda}/(r_0 - r_1),$$

where $c_2$ is a system determined constant, V is the velocity of the radar platform, $r_1$ and $r_0$ are distances from said platform to said at least one point and said reference point and $U_1$ and $U_0$ are unit vectors directed from said platform toward said at least one point and said reference point.

4. The system of claim 1, further characterized in that both said carrier wavelength and said variable pulse repetition interval are altered in a predetermined manner in response to signals from said means for measuring acceleration such that, for at least one point in said target area in addition to said map reference point, a phase difference between return radiation from said map reference point and return radiation from said at least one point is substantially constant for consecutive radar pulses, whereby both said map reference point and said at least one point are in sharp focus and said radar map has an improved depth of focus.

* * * * *